United States Patent
Azam et al.

(10) Patent No.: US 10,382,964 B2
(45) Date of Patent: Aug. 13, 2019

(54) DEVICE ACTIVITY CONTROL

(71) Applicant: Hewlett-Packard Development Company, L.P., Houston, TX (US)

(72) Inventors: Syed S. Azam, Tomball, TX (US); Jason Huang, Palo Alto, CA (US); John M. Main, Fort Collins, CO (US); Michael Provencher, Cypress, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 173 days.

(21) Appl. No.: 15/500,239

(22) PCT Filed: Jul. 31, 2014

(86) PCT No.: PCT/US2014/049139
§ 371 (c)(1),
(2) Date: Jan. 30, 2017

(87) PCT Pub. No.: WO2016/018365
PCT Pub. Date: Feb. 4, 2016

(65) Prior Publication Data
US 2017/0265080 A1    Sep. 14, 2017

(51) Int. Cl.
*H04L 29/06* (2006.01)
*H04W 12/08* (2009.01)
(Continued)

(52) U.S. Cl.
CPC ......... *H04W 12/08* (2013.01); *H04L 63/0876* (2013.01); *H04L 63/101* (2013.01);
(Continued)

(58) Field of Classification Search
CPC . H04L 63/0853; H04L 63/0876; H04L 63/10; H04L 63/101; H04L 63/107;
(Continued)

(56) References Cited

U.S. PATENT DOCUMENTS 6,189,105 B1 * 2/2001 Lopes ................ G06F 21/35
726/20
6,594,762 B1 * 7/2003 Doub ................ G06F 21/35
235/385
(Continued)

FOREIGN PATENT DOCUMENTS

| | | |
|---|---|---|
| CN | 103378876 | 10/2013 |
| EP | 2725834 | 4/2014 |
| WO | WO-2013095001 | 6/2013 |

OTHER PUBLICATIONS

Hocking et al. "Co-operative user identity verification using an Authentication Aura" [Online], 2013 [Retrieved on: Sep. 10, 2108], Retrieved from: <http://dx.doi.org/10.1016/j.cose.2013.09.011> (Year: 2013).*
(Continued)

*Primary Examiner* — Eric W Shepperd
(74) *Attorney, Agent, or Firm* — HPI Patent Department (57) ABSTRACT

In an example implementation, a method of controlling activity of a device includes concurrently detecting multiple unique device identifier (UDIDs) within proximity of a primary device, and determining that the multiple UDIDs are associated with a primary device activity. The method includes performing the activity while the concurrent detection of the multiple UDIDs persists, and stopping the activity when the concurrent detection of the multiple UDIDs stops.

17 Claims, 6 Drawing Sheets

(51) Int. Cl.
  *H04W 4/00* (2018.01)
  *H04W 8/00* (2009.01)
  *H04W 4/80* (2018.01)
  *H04W 4/02* (2018.01)
  *H04W 12/06* (2009.01)

(52) U.S. Cl.
  CPC ........ H04L 63/107 (2013.01); H04L 65/4076 (2013.01); H04W 4/00 (2013.01); H04W 4/023 (2013.01); H04W 4/80 (2018.02); H04W 8/005 (2013.01); H04W 12/06 (2013.01); *H04L 2463/062* (2013.01)

(58) Field of Classification Search
  CPC ..... H04W 4/023; H04W 8/005; H04W 12/06; H04W 12/08; G06F 21/34
  See application file for complete search history.

(56) References Cited

U.S. PATENT DOCUMENTS

| | | | | |
|---|---|---|---|---|
| 7,375,615 | B2* | 5/2008 | Kitagawa | G06F 21/35 340/5.81 |
| 7,378,939 | B2* | 5/2008 | Sengupta | H04M 1/67 340/5.53 |
| 8,050,698 | B2* | 11/2011 | Seligmann | G07C 9/00111 455/41.2 |
| 8,555,411 | B2* | 10/2013 | Hurwitz | H04L 63/104 380/265 |
| 8,571,541 | B2* | 10/2013 | Seligmann | G06F 21/6218 455/403 |
| 8,576,071 | B2* | 11/2013 | Lo | G06F 21/35 340/5.2 |
| 8,918,844 | B1* | 12/2014 | Friedman | G06F 21/42 726/4 |
| 9,336,357 | B2* | 5/2016 | Smith | G06F 21/00 |
| 9,430,624 | B1* | 8/2016 | Mortensen | G06F 21/31 |
| 9,549,323 | B2* | 1/2017 | Lee | G06F 21/35 |
| 9,626,493 | B2* | 4/2017 | Cohen | G06F 21/31 |
| 9,769,160 | B2* | 9/2017 | Park | H04L 63/0853 |
| 2002/0186676 | A1 | 12/2002 | Milley et al. | |
| 2003/0034877 | A1* | 2/2003 | Miller | B60R 25/246 340/5.61 |
| 2006/0224048 | A1* | 10/2006 | Devaul | A61B 5/0024 600/300 |
| 2009/0124258 | A1* | 5/2009 | Jeon | H04W 36/0083 455/436 |
| 2009/0249457 | A1 | 10/2009 | Graff et al. | |
| 2010/0067421 | A1 | 3/2010 | Gorokhov et al. | |
| 2010/0105423 | A1 | 4/2010 | Gupta | |
| 2011/0055606 | A1 | 3/2011 | Wu et al. | |
| 2011/0195665 | A1* | 8/2011 | Friedlaender | G08C 17/02 455/41.2 |
| 2011/0317586 | A1 | 12/2011 | Palanki et al. | |
| 2012/0020265 | A1 | 1/2012 | Wu et al. | |
| 2013/0145420 | A1 | 6/2013 | Ting et al. | |
| 2013/0159537 | A1 | 6/2013 | Kwon et al. | |
| 2013/0227418 | A1* | 8/2013 | Sa | G06F 3/0488 715/728 |
| 2013/0268687 | A1* | 10/2013 | Schrecker | H04W 12/06 709/229 |
| 2013/0291056 | A1* | 10/2013 | Gaudet | H04W 12/06 726/1 |
| 2014/0160965 | A1 | 6/2014 | Moon et al. | |
| 2015/0057802 | A1* | 2/2015 | Kroyan | B25J 9/1684 700/259 |
| 2015/0127733 | A1* | 5/2015 | Ding | H04W 4/08 709/204 |
| 2015/0296020 | A1* | 10/2015 | Granqvist | H04W 76/14 455/41.2 |
| 2015/0350974 | A1* | 12/2015 | Patil | H04W 36/0083 370/331 |
| 2016/0006744 | A1* | 1/2016 | Du | H04L 63/102 726/4 |
| 2018/0139579 | A1* | 5/2018 | Camps | H04W 12/06 |

OTHER PUBLICATIONS

Kalamandeen, A. et al.; "Ensemble: Cooperative Proximity-based Authentication"; Jun. 15-18, 2010; 13 pages.

* cited by examiner

| | | | | |
|---|---|---|---|---|
| 400 — 1st Activity | Initiate web browser application and open news page at URL xyz | UDID(1) UDID(4) | non-ordered | — 406 |
| 402 — 2nd Activity | Unlock car door | UDID(3) UDID(6) | ordered | — 404 |
| nth Activity | — — — — — — — | — — — — — | — — — — — | |

DEVICE ACTIVITY CONTROL

CROSS-REFERENCE TO RELATED APPLICATION

This application is a U.S. National Stage Application of and claims priority to International Patent Application No. PCT/US2014/049139, filed on Jul. 31, 2014, and entitled "DEVICE ACTIVITY CONTROL," which is hereby incorporated by reference in its entirety.

BACKGROUND

As technology continues to advance, the use of mobile computing devices and related accessories has become ubiquitous. Technological advances have enabled billions of users throughout the world to benefit from the use of all manner of such devices ranging, for example, from smart phones, media players, tablet computers, and onboard automobile computers, to wearable devices such as smart watches, smart eyewear, headsets, pedometers, heart monitors, and so on. As the number of these devices and device users continues to increase, efforts toward improving the efficiency of human interaction with such devices are ongoing.

BRIEF DESCRIPTION OF THE DRAWINGS

Examples will now be described with reference to the accompanying drawings, in which.

Throughout the drawings, identical reference numbers designate similar, but not necessarily identical, elements.

DETAILED DESCRIPTION

Mobile and other computing devices have become an essential part of life for billions of users around the world. There is a significant variety of such devices ranging, for example, from smart phones, media players, tablet computers, and onboard automobile computers, to wearable devices such as smart watches, smart eyewear, headsets, pedometers, heart monitors, and so on. Traditional computing platforms such as laptop and desktop computers also continue to be a mainstay of productivity for many computer users. As the number of these devices and people using them continues to increase, the efficiency of human-computer/device interaction becomes increasingly significant. For example, the ability to quickly access functionality of a computing device without enduring a tedious identification and logon process and/or activity/application initiation process provides a considerable benefit for users who own and use numerous devices. However, there is generally a tradeoff between the convenience of having such quick access to device functionality and the risk that unauthorized users might also be able to access such devices for the same or different functionality.

Example methods and devices disclosed herein take advantage of the wireless communications technologies integrated into many computing devices to enable convenient and secure access to computer device functionality. User-configurable combinations of unique device identifiers (UDIDs) can be used as tokens to authenticate and control (e.g., start and stop) activities in computer devices when such devices come in and out of a detectable range of one another. Activities generally refer to any executable applications or other functions on a computer device available to a user through typical user interfaces and input/output mechanisms. Thus, a user can configure a primary device to automatically perform an activity when the primary device detects the presence of a particular combination or set of secondary devices within its vicinity, and to automatically stop performing the activity when the primary device detects that the particular combination or set of secondary devices is no longer within its vicinity. The primary device detects the presence of secondary devices by scanning for secondary device UDIDs at user-configured scan intervals. Secondary devices broadcast or advertise their respective UDIDs over various wireless radio communications protocols executing on the secondary devices. The primary device can compare detected UDIDs to a user-configured authorized list of "friendly" UDIDs to confirm their authenticity. The primary device further compares detected UDIDs to a user-configured activity association list to determine if an activity has been associated with the concurrent detection of multiple UDIDs. When an activity is associated in the activity association list with multiple UDIDs, the primary device performs the activity when all of the associated UDIDs are detected concurrently (i.e., by the same scan) within the vicinity of the primary device, and stops performing the activity when less than all of the associated UDIDs are detected within the vicinity of the primary device.

It is significant to note that reference to a computer device as being a "primary" device or a "secondary" device is arbitrary. Such references are intended merely to provide a perspective for describing particular device detection scenarios. For example, in any given detection scenario with multiple computer devices coming within a detectable range of one another, any one of the computer devices can be the "primary" device for the purpose of describing which of the devices has been configured to control an activity based on detecting the other devices. Thus, in a single scenario in which three computer devices are brought within a detectable range of one another, any one of the three devices can be the primary device configured to control/perform an activity upon detecting the other two devices. Furthermore, in such a scenario, one, two, or all three, of the computer devices may be configured to perform an activity upon detecting the other two devices. Thus, depending on the descriptive perspective, the devices can be interchangeably referred to as primary or secondary devices, because any one of the devices can be referred to as the primary device, while the other two devices would be referred to as the secondary devices, and so on. Therefore, designating or referring to a device as a primary or secondary device merely provides a descriptive perspective.

Advantages of this method of controlling activities on computing devices include that the user interaction with the devices is minimized to pre-configuring devices with an authorized UDID list and an activity association list. Thereafter, an activity on a device is controlled automatically based on its detecting the presence of any pre-configured combinations of UDIDs from other devices. The detection of devices is based on the passive reception of the broadcast UDIDs from the devices, and does not involve pairing any of the devices, or any hand-shaking or other two-way communication between any of the devices.

This method enables the automation of activities on computer devices, and there are virtually endless examples of the types of activities that are controllable using this method. For instance, a user can pre-configure a "primary" PC device to automatically wake up and open a web browser to display a web page that provides current weather conditions within a particular geographic location whenever the user comes within the vicinity of the PC while carrying (or wearing) a pre-configured combination of "secondary" devices, such as a smart phone and a smart pedometer. In this scenario the user gains automatic access through the PC to pending weather conditions as he prepares for his daily morning jog, without having to physically interact with the PC or the other computing devices. In another example, a user can pre-configure an automobile computing system to unlock and start the automobile whenever the user comes within the vicinity of the automobile carrying his smart phone and key fob.

Thus, pre-configuration of a computing device enables automatic authentication and control of activities on the device. Once a primary device is pre-configured, the user has no further interaction with the primary device or the secondary devices being detected in order to start, stop, or otherwise control, pre-configured activities. This enables users to avoid the typical steps involved in initiating and stopping particular device activities, as well as avoiding having to remember or interact with device UDIDs and/or device identifications (IDs) and passwords. This removes the risk of users forgetting or misplacing device IDs and passwords, and significantly limits a rogue user's ability to gain unauthorized access to device functionality.

In one example, a method of controlling activity of a primary device includes concurrently detecting multiple UDIDs in proximity of the primary device. A determination can be made that the multiple UDIDs are associated with a primary device activity. The determination can be made, for example, by accessing an activity association list and comparing the detected UDIDs with pre-configured combinations of UDIDs that have been associated with the primary device activity by a user. The method includes performing the activity while the concurrent detection of the multiple UDIDs persists, and stopping the activity when the concurrent detection of the multiple UDIDs stops. Thus, primary device activities, configured (i.e., pre-selected) by a user, can be initiated and controlled based on the detected presence (i.e., proximity) of different, user-configurable combinations of secondary devices that come within proximity of the primary device.

In another example, a primary computing device includes a plurality of different wireless radio communications engines. Each wireless radio engine is enabled to detect a UDID that is broadcast from a secondary device over a particular wireless radio communication protocol. The primary device also comprises an activity association list that includes a primary device activity that has been associated with a pre-configured UDID grouping. An activity control module included on the primary device is to compare the detected UDIDs with UDIDs in the pre-configured UDID grouping, and to control the primary device activity when the UDIDs in the pre-configured UDID grouping are concurrently detected.

In another example, a non-transitory machine-readable storage medium stores instructions that when executed by a processor of a primary device, cause the primary device to scan for unique device identifiers (UDIDs) associated with secondary devices. During the scan the primary device can detect a plurality of UDIDs within a scanning range. The instructions further cause the primary device to determine from a user-configured activity list, that at least two UDIDs are associated with a primary device activity, and to control the primary device to perform the activity while the at least two UDIDs are detected by the scan.

Figure 1A:
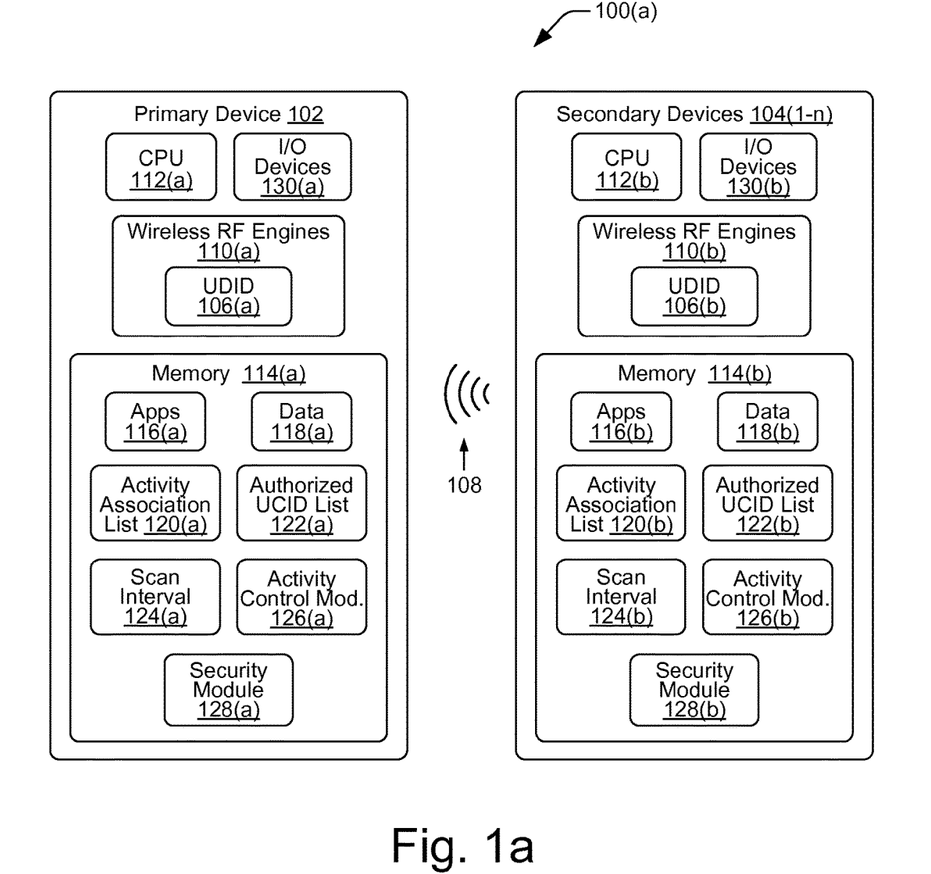
FIGS. 1a and 1b show examples of computing environments suitable for enabling the control of activities of a computing device based on the computing device detecting the presence of other devices within the vicinity of the computing device.
Figure 1B:
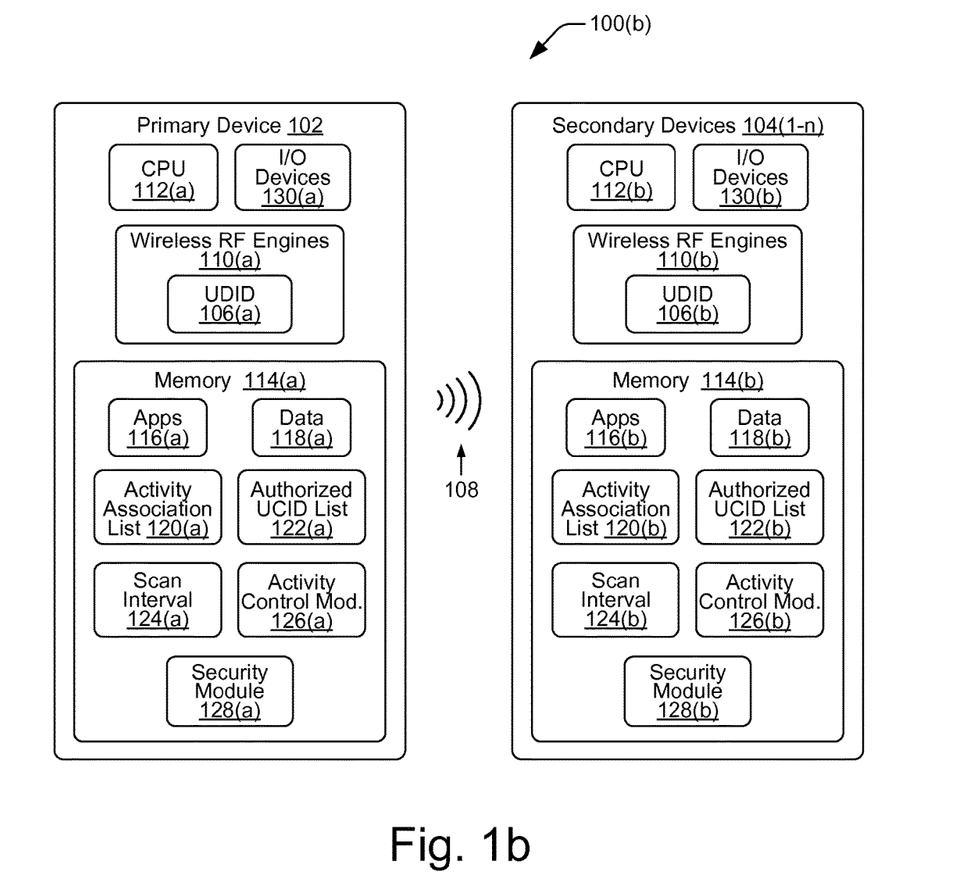

FIGS. 1a and 1b show examples of computing environments 100(a) and 100(b) suitable for enabling the control of activities of a computing device based on the computing device detecting the presence of other devices within the vicinity of the computing device. Referring generally to both FIGS. 1a and 1b, the environment 100 includes a primary computer device 102 and multiple secondary devices 104 (1-n). A primary computer device 102 can be any computer device configured with appropriate protocols to scan for, detect, and read, unique device identifiers (UDIDs) 106 being broadcast or advertised over a radio frequency 108, such as from secondary devices 104 implementing any of a variety of different types of wireless radio communication protocols. A secondary device 104 can be any device that broadcasts or otherwise advertises its presence through a wireless radio communication protocol or a hardwire connection using a UDID 106. As noted above, the designation and/or reference of computing devices as being primary or secondary is arbitrary, because each device can interchangeably be considered a primary device that detects UDIDs, or a secondary device that broadcasts its presence with its UDID. Accordingly, as shown in FIG. 1, the primary device 102 and secondary devices 104 have the same general component configurations.

Common examples of primary devices 102 and secondary devices 104 include, but are not limited to, personal computers, PDAs (personal digital assistants), automobile computers, smart phones, and tablet computers, as well as wearable devices such as wireless headsets, smart watches, smart eyewear, pedometers, heart monitors, and so on. Examples of suitable types of wireless radio communication protocols include, but are not limited to, Bluetooth, Wi-Fi, Zigbee, iBeacon, and NFC. A UDID 106 is typically a unique identifier associated with the wireless radio communication chip set and can include, for example, a MAC address (media access control address), an IMEI (International Mobile Equipment Identity) ID, an IMS (International Mobile Subscriber) ID, or other unique identifier that includes, for example, some combination of information identifying the device vendor, the product number, the serial number, and so on.

Both primary devices 102 and secondary devices 104 can advertise their presence by broadcasting their UDIDs 106 (e.g., UDID 106(a), UDID 106(b)) over any one of a variety of different wireless radio communication protocols. Thus, as shown in FIG. 1, both the primary device 102 and secondary devices 104 incorporate one or more wireless radios, illustrated as wireless radio frequency (RF) engines 110 (i.e., 110(a), 110(b)), each having an associated UDID 106. Devices may incorporate multiple types of wireless RF engines 110 to enable the detection and reading of UDIDs 106 being broadcast over a variety of wireless radio communication protocols. A wireless RF engine 110 generally comprises different hardware components such as an integrated circuit (IC) chip set and software components that implement a set of standards to establish radio communication between devices when the devices are brought within a certain range or proximity to one another. The types of wireless protocols implemented by the wireless RF engines 110(a) and 110(b) on a primary device 102 and a secondary device 104, respectively, enable short-range wireless communications between the devices.

However, as noted below, the automatic control over pre-configured activities of a primary device 102 can be achieved on the basis of merely a one-way communication from the secondary devices 104 broadcasting UDIDs 106 (b), and a passive detection by the primary device 102 of those broadcast UDIDs. This is intended to be illustrated in FIG. 1a by the single direction in which the radio frequency waves 108 are propagating from the secondary devices 104 toward the primary device 102. However, in different detection scenarios, primary and secondary devices are generally interchangeable, as discussed above, enabling automatic control over pre-configured activities of a particular secondary device 104(1) by similar one-way communications from the primary device 102 containing a UDID 106(a). Such different detection scenarios are intended to be illustrated by the environment 100(b) in FIG. 1b, which shows the radio frequency waves 108 propagating in the single but opposite direction away from the primary device 102 and toward the secondary device 104. Thus, in any detection scenario between the primary device 102 and secondary devices 104, there is not a two-way communication occurring between the devices, nor is there any other type of hand-shaking or pairing involved between the devices to enable the described control of pre-configured activities on either the primary device 102 or a secondary device 104. There is merely a one-way broadcast from one or more devices 102, 104, containing UDIDs, that are passively detected by one or more devices 102, 104, in order to detect UDIDs and to control device activities on the basis of pre-configured combinations of devices.

The range or distance over which a device 102, 104, can detect a UDID 106 broadcast from another device 102, 104, is generally a short range that depends on the particular wireless radio communication protocol being implemented on the devices. For example, the distance or range at which a primary device 102 might detect a secondary device 104 broadcasting a UDID 106(b) when using the Bluetooth radio protocol may be on the order of up to 10 meters, while the range of UDID detection when the secondary device is broadcasting using a Wi-Fi radio protocol may be on the order of 100 meters or more. Other variables can also impact the detection range, such as indoor or outdoor use, the use of different frequency bands, and the type of antenna being used. Accordingly, different secondary devices 104(1-n) may be detectable by a primary device 102 at different distances.

Figure 2:
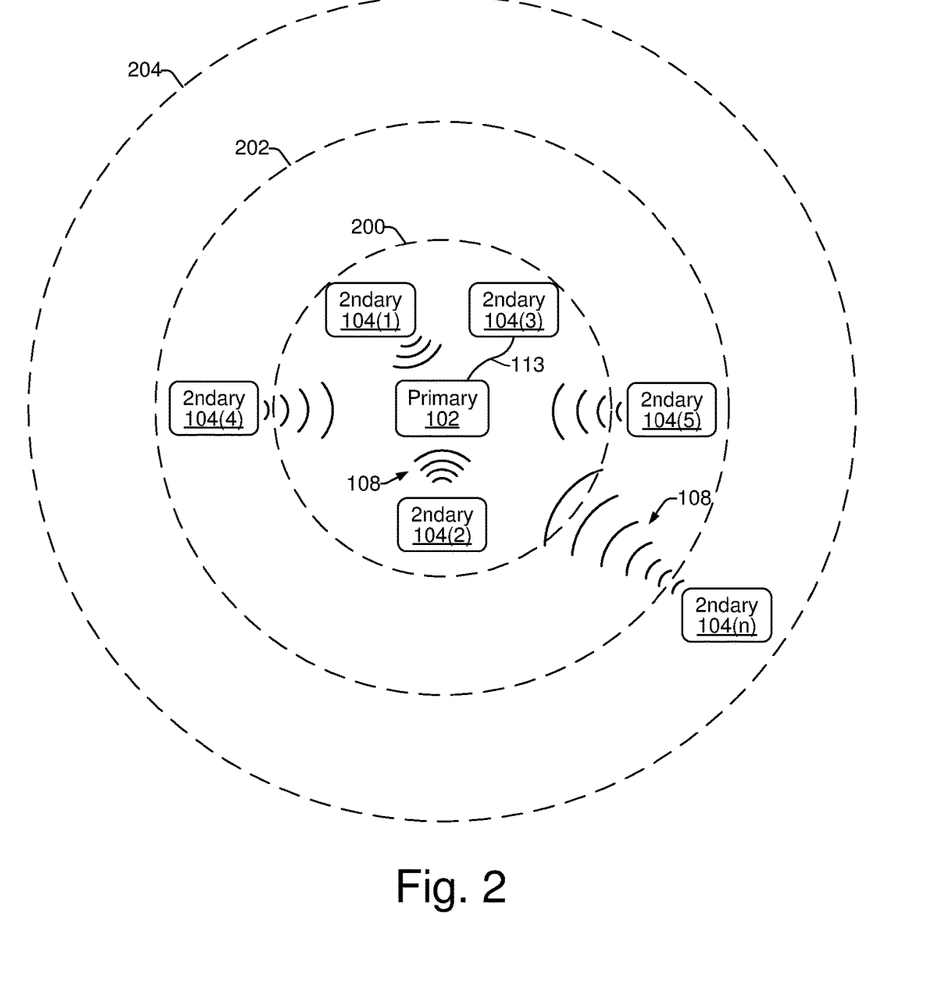
FIG. 2 shows an example of multiple secondary devices within different detectable ranges of a primary device.

To help illustrate this point, FIG. 2 shows an example of multiple secondary devices 104(1-n) within different detectable ranges of a primary device 102. In some examples, a secondary device is detectable when it is directly coupled to a primary device 102 by a physical connector 113 such as a Universal Serial Bus (USB) connector, as indicated by secondary device 104(3). While different secondary devices 104(1-n) are shown in FIG. 2 at three different ranges 200, 202, and 204, each of the secondary devices 104 is detectable by the primary device 102. The varying detectable ranges are primarily the result of different types of wireless radio communication protocols each secondary device 104 may be implementing. Therefore, the UDIDs 106(b) of different secondary devices 104(1-n) may be detectable by the primary device 102 at varying ranges. In general, however, the wireless communication protocols used are short range protocols whose operable distances range from zero (i.e., devices touching one another) up to maximum distances on the order of 100 meters.

Referring again to FIG. 1, a primary device 102 and secondary devices 104 each generally incorporate components of a typical computing device, such as one or more processors (CPU) 112 (illustrated as CPU 112(a) on primary device 102, and CPU 112(b) on secondary devices 104), and a memory 114 (illustrated as memory 114(a) on primary device 102, and memory 114(b) on secondary devices 104). Memory 114 can include both volatile (i.e., random access memory) and nonvolatile (e.g., read-only memory, hard disk, optical disc, magnetic tape, flash memory, etc.) memory components. The components of memory 114 comprise non-transitory, machine-readable (e.g., computer/processor-readable) media that provide for the storage of machine-readable coded program instructions, data structures, program instruction modules, applications, and other data for the devices 102 and 104, such as applications 116(a), 116(b), and data 118(a), 118(b), shown respectively on the primary device 102 and secondary devices 104. In some examples, memory 114 also includes additional data stored as user-configurable lists (i.e., activity association lists 120(a) and 120(b), and authorized UDID lists 122(a) and 122(b)) and scan intervals 124(a) and 124(b), as well as a program instruction activity control modules 126(a) and 126(b), discussed in further detail below. In some examples, the primary device 102 and secondary devices 104 may additionally include respective security modules 128(a) and 128(b), compatible to provide encryption/decryption capability with regard to UDIDs 106, as noted below.

The program instructions, applications, data structures, and modules stored in memory 114 may be part of an installation package that can be executed by processors 112 to implement various examples, such as examples discussed herein. Thus, memory 114 may be a portable medium such as a Compact Disc (CD), a Digital Versatile Disc (DVD), a flash drive, or a memory maintained by a server from which the installation package can be downloaded and installed. In another example, the program instructions, applications, data structures, and modules stored in memory 114 may be part of an application or applications already installed, in which case memory 114 may include integrated memory such as a hard drive.

Devices 102 and 104 also typically include various input/output (I/O) devices, illustrated respectively as I/O devices 130(a) and 130(b). In different examples, depending on the type of device, such I/O devices 130 can include, for example, a key pad and/or a touch-sensitive display that implements a key pad, a speaker, a microphone, a camera, a keyboard, a mouse, a display monitor, and so on.

As noted above, the primary and secondary devices 102 and 104 may implement various application programs 116 (i.e., by execution on a processor 112). Such applications 116 can vary widely in the activities or functionality they provide for a user, and can include activities/functions such as web browsing, image editing, word processing, spreadsheets, media playback, and so on. In different scenarios, both primary and secondary devices, 102 and 104, can enable the automatic control of such activities through the detection of authorized devices that move in and out of a detectable range.

Figure 3:
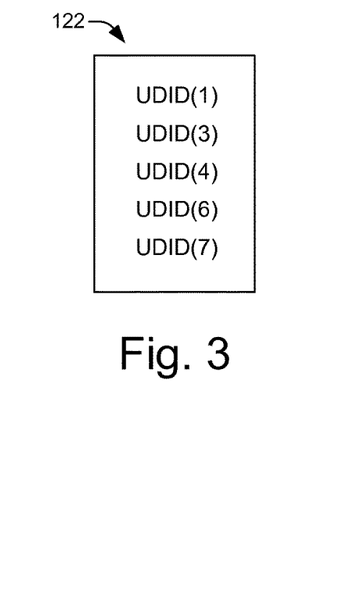
FIG. 3 shows an example of an authorized unique device identifier (UDID) list that has been preconfigured by a user.
Figure 4:
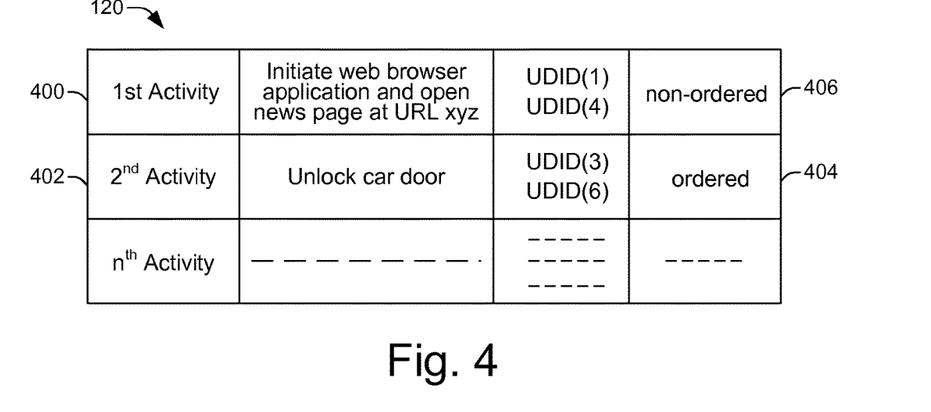
FIG. 4 shows an example of an activity association list.

More specifically, the activity control module 126 comprises instructions executable on processor 112 to enable a user to pre-configure the authorized UDID list 122 and activity association list 120. FIG. 3 shows an example of an authorized UDID list 122 that has been preconfigured by a user. As is shown, the authorized UDID list 122 includes a list of device UDIDs 106 that are authorized by the user for use in providing automatic activity control on a primary device 102. FIG. 4 shows an example of an activity association list 120. The activity association list 120 includes pre-configured activities to perform on the primary device 102 in association with two or more device UDIDs. For example, a first activity 400, such as opening up a news page on a web browser application, may be associated with two specific secondary devices (e.g., secondary device 104(1) and secondary device 104(4)) through their respective UDIDs (e.g., UDID(1) and UDID(4)). Another activity 402, such as unlocking a car door, may be associated with two other secondary devices (e.g., secondary device 104(3) and secondary device 104(6)) through their respective UDIDs (e.g., UDID(3) and UDID(6)).

In some examples, activities in the activity association list 120 are also associated with an order or sequence in which two or more device UDIDs are detected by another device. For example, the activity association list 120 can include an "ordered" 404 and "non-ordered" 406 option that can be configured by a user to control an associated activity depending not only the concurrent detection of secondary devices 104, but also on a correct order of detection of those secondary devices. As shown in FIG. 4, the activity association list 120 associates the first activity 400 with a non-ordered detection option, which means that the concurrent detection of UDID(1) and UDID(4), regardless of the order of their detection, will cause primary device to automatically control the first activity 400. However, with the second activity 402, an ordered detection option is selected, which means that concurrent detection of UDID(3) and UDID(6) along with the listed order of UDID detection are both needed in order to control of the second activity 402.

The activity control module 126 further executes in cooperation with wireless RF engines 110 to detect devices within a detectable range, and to determine a device UDID 106 that is being broadcast by the device. The activity control module 126 first determines if a detected UDID 106 is an authorized UDID by comparing it with the user-configured authorized UDID list 122. The activity control module 126 further determines which activities (e.g., applications 116) have been associated through the activity association list 120 with particular combinations of devices. That is, the activity control module 126 accesses the activity association list 120 and compares detected UDIDs 106 with UDIDs on the list 120 to determine if a listed combination of UDIDs has been detected. If a listed combination of UDIDs is detected concurrently, it indicates that the devices associated with the detected UDIDs are within the vicinity of the detecting device (e.g., primary device 102) at the same time (i.e., during the same scan), and the activity control module 126 controls the associated activity from the activity association list 120. Controlling the activity includes performing the activity as long as the UDIDs in the listed combination of UDIDs are being concurrently detected, and stopping the activity when one of the UDIDs in the listed combination of UDIDs is no longer being detected.

The scan interval 124 is a user-configurable time interval that can be set to control when a device 102, 104, scans for UDIDs being broadcast by other devices 102, 104. Thus, concurrent detection of multiple UDIDs is defined herein as the detection of the multiple UDIDs on the same scan. For example, in a first scan, UDID(1) and UDID(4) might be detected by a primary device 102. Based on such concurrent detection by the primary device 102, an activity such as first activity 400 can be controlled. Controlling would include performing the first activity 400 (FIG. 4) by initiating a web browser application and opening a particular news page at a predefined URL. The performance of the first activity 400 continues so long as the concurrent detection of UDID(1) and UDID(4) persists. For example, if the scan interval 124 is set to 5 seconds, and there is concurrent detection of UDID(1) and UDID(4) for 6 consecutive scans, performance of the first activity 400 will continue for 30 seconds. However, on a next scan, such as a $7^{th}$ scan, if one or both of the UDIDs is no longer detected, then the primary device 102 controls the first activity 400 to stop the activity. In some examples, a delay in stopping the activity may be provided when one or both of the UDIDs is no longer detected, in order to accommodate situations in which a user has briefly stepped out of the vicinity. Such delay times may be one or more scan cycles of periods of time configurable by the user. In this manner, a user can configure automatic control of device activities based on coming into and out of a detectible range of pre-configured combinations of other devices.

In some examples, security module 128(*b*) on a secondary device 104 can execute to incorporate encryption into a UDID 106. For example, security module 128(*b*) can encode a UDID 106 and generate a key using an encryption algorithm so that only an authorized primary device 102 can read it. When the primary device 102 receives the encrypted UDID 106, with the attached key, a corresponding security module 128(*a*) on the primary device 102 can use the key to decrypt the UDID.

Figure 5:
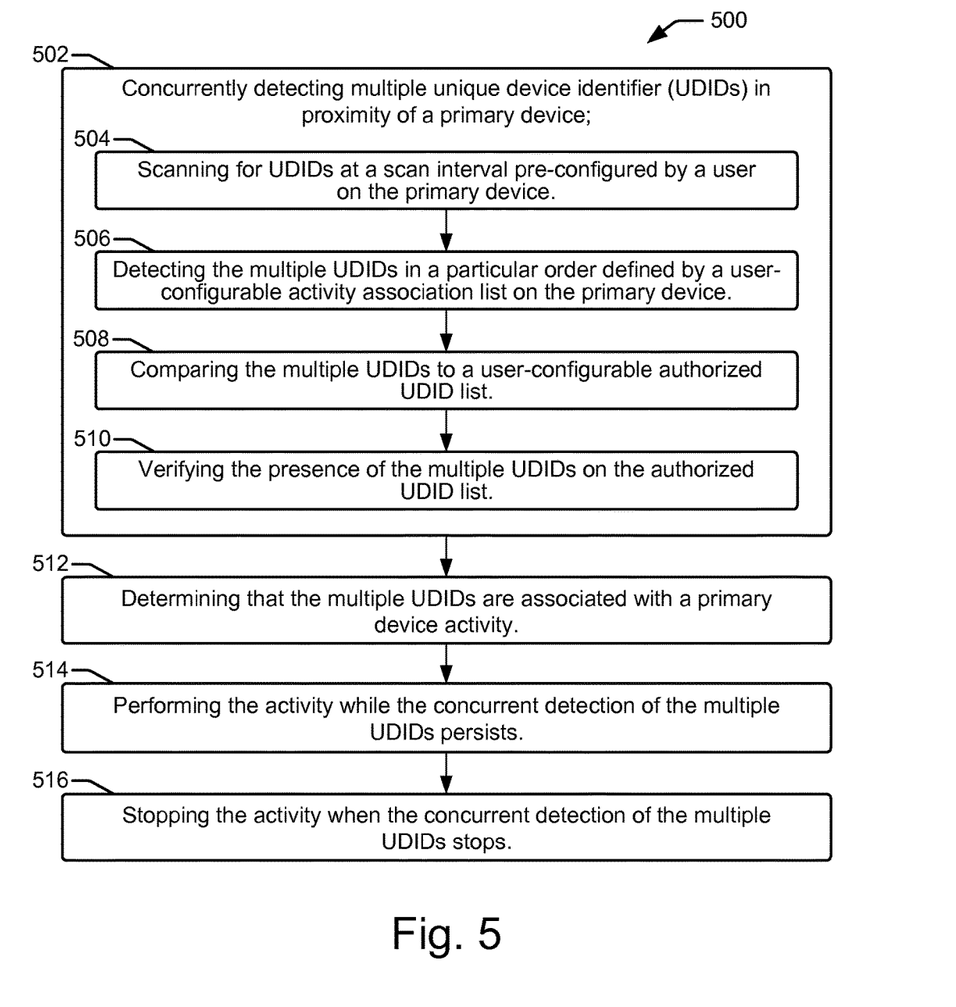
FIGS. 5 and 6 show flow diagrams that illustrate example methods related to enabling the control of activities of a computing device based on the computing device detecting the presence of other devices within the vicinity of the computing device.
Figure 6:
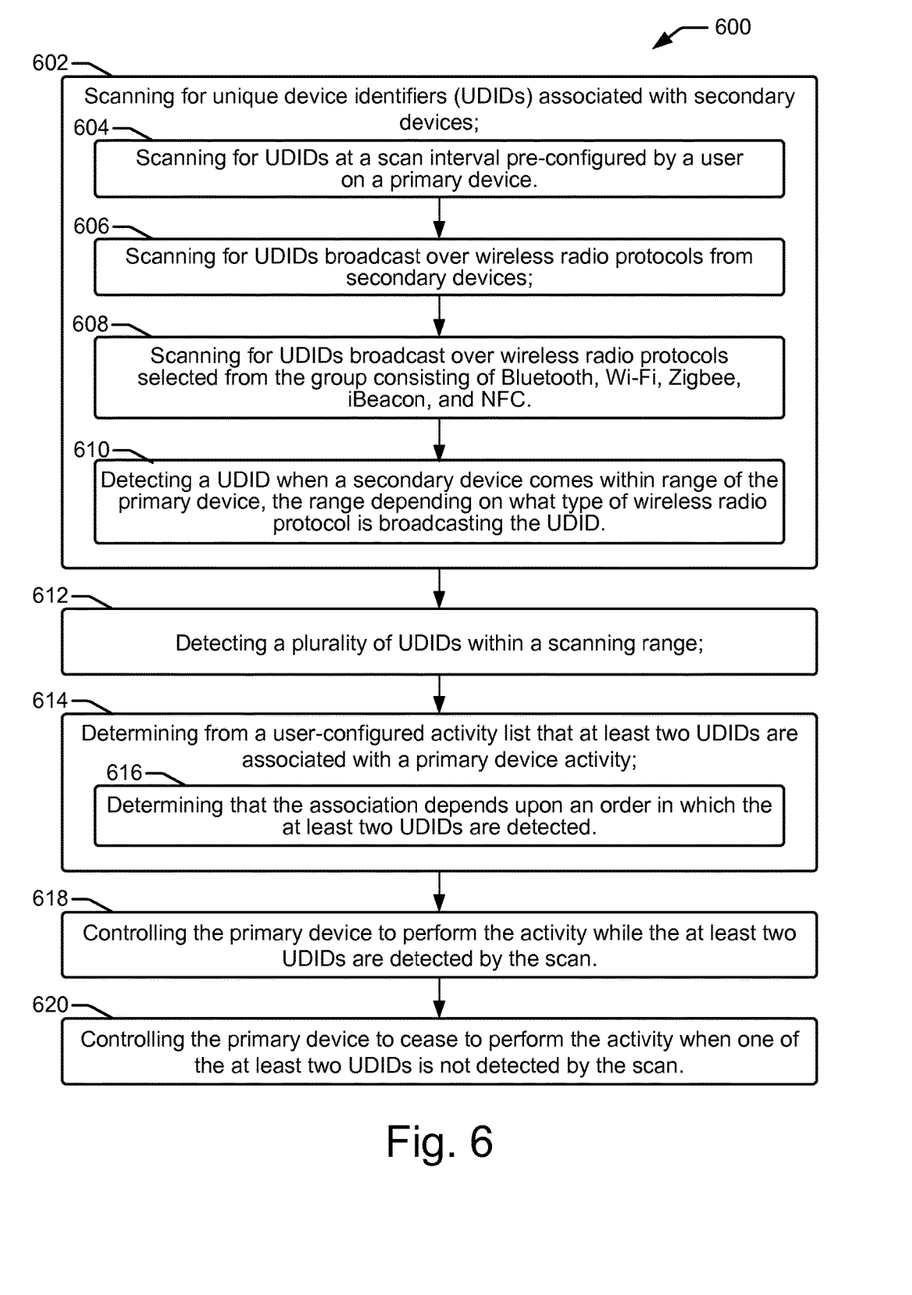

FIGS. 5 and 6 show flow diagrams that illustrate example methods 500 and 600, related to enabling the control of activities of a computing device based on the computing device detecting the presence of other devices within the vicinity of the computing device. Methods 500 and 600 are associated with the examples discussed above with regard to FIGS. 1-4, and details of the operations shown in methods 500 and 600 can be found in the related discussion of such examples. The operations of methods 500 and 600 may be embodied as programming instructions stored on a non-transitory, machine-readable (e.g., computer/processor-readable) medium, such as memory 114 of primary device 102 as shown in FIG. 1. In some examples, implementing the operations of methods 500 and 600 can be achieved by a processor, such as a processor 112 of FIG. 1, reading and executing the programming instructions stored in a memory 114. In some examples, implementing the operations of methods 500 and 600 can be achieved using an ASIC (application specific integrated circuit) and/or other hardware components alone or in combination with programming instructions executable by processor 112.

Methods 500 and 600 may include more than one implementation, and different implementations of methods 500 and 600 may not employ every operation presented in the respective flow diagrams. Therefore, while the operations of methods 500 and 600 are presented in a particular order within the flow diagrams, the order of their presentation is not intended to be a limitation as to the order in which the operations may actually be implemented, or as to whether all of the operations may be implemented. For example, one implementation of method 500 might be achieved through the performance of a number of initial operations, without performing one or more subsequent operations, while another implementation of method 500 might be achieved through the performance of all of the operations.

Referring now to the flow diagram of FIG. 5, an example method 500 of controlling activity of a device begins at block 502, with concurrently detecting multiple unique device identifiers (UDIDs) within proximity of a primary device. As shown at block 504, concurrently detecting multiple UDIDs can include scanning for UDIDs at a scan interval pre-configured by a user on the primary device. Concurrently detecting multiple UDIDs can also include detecting the multiple UDIDs in a particular order defined by a user-configurable activity association list on the primary device, as shown at block 506. As shown at blocks 508 and 510, respectively, concurrently detecting multiple UDIDs can also include, comparing the multiple UDIDs to a user-configurable authorized UDID list, and then verifying the presence of the multiple UDIDs on the authorized UDID list.

The method 500 continues at block 512, with determining that the multiple UDIDs are associated with a primary device activity. At block 514, after determining that the multiple UDIDs are associated with a primary device activity, the method includes performing the activity while the concurrent detection of the multiple UDIDs persists. At block 516, the method then concludes with stopping the activity when the concurrent detection of the multiple UDIDs stops.

Referring now to the flow diagram of FIG. 6, an example method 600 related to enabling the control of activities of a computing device based on the computing device detecting the presence of other devices within the vicinity of the computing device, begins at block 602 with a primary device scanning for unique device identifiers (UDIDs) associated with secondary devices. As shown at block 604, scanning for UDIDs associated with secondary devices can include scanning for UDIDs at a scan interval pre-configured by a user on the primary device. As shown at blocks 606 and 608, respectively, scanning for UDIDs associated with secondary devices can also include scanning for UDIDs that are broadcast over wireless radio protocols from secondary devices, where the wireless radio protocols can be protocols selected from the group consisting of Bluetooth, Wi-Fi, Zigbee, iBeacon, and Near-Field Communication (NFC). As shown at block 610, scanning for UDIDs associated with secondary devices can include detecting a UDID when a secondary device comes within range of the primary device, where the range depends on what type of wireless radio protocol is broadcasting the UDID.

The method 600 continues at block 612 with detecting a plurality of UDIDs within a scanning range. At block 614, the method 600 includes determining from a user-configured activity list that at least two UDIDs are associated with a primary device activity. Determining that at least two UDIDs are associated with a primary device activity can include determining that the association depends upon an order in which the at least two UDIDs are detected, as shown at block 616. The method then continues at blocks 618 and 620, respectively, with controlling the primary device to perform the activity while the at least two UDIDs are detected by the scan, and controlling the primary device to cease to perform the activity when one of the at least two UDIDs is not detected by the scan.

What is claimed is:

1. A method of controlling activity of a device comprising:

detecting a first set of unique device identifiers (UDIDs) in proximity of a primary device in a particular detection order;

comparing the detected first set of UDIDs to a stored activity list specifying a plurality of activities;

identifying, based on a comparison of the detected first set of UDIDs to the stored activity list, a first device activity that is specified as being associated with the detected first set of UDIDs in the stored activity list, wherein the stored activity list specifies that the first device activity is performed in response to detecting the first set of UDIDs in the particular detection order, wherein the stored activity list includes data specifying the particular detection order;

performing the identified first device activity while a detection of the first set of UDIDs persists; and stopping the identified first device activity when the detection of the first set of UDIDs stops.

2. A method as in claim 1, wherein the stored activity list specifies a second device activity as being associated with a second set of UDIDs, wherein the second set of UDIDs is different from the first set of UDIDs, wherein the stored activity list specifies that the second device activity is performed in response to detecting the second set of UDIDs in any detection order.

3. A method as in claim 1, wherein detecting the first set of UDIDs comprises:

comparing the first set of UDIDs to a user-configurable authorized UDID list; and verifying the presence of the first set of UDIDs on the authorized UDID list, wherein the authorized UDID list and the stored activity list are separate data structures.

4. A method as in claim 1, wherein detecting the first set of UDIDs comprises:

scanning for UDIDs at a scan interval pre-configured by a user on the primary device.

5. A method as in claim 1, wherein the first set of UDIDs are detected within varying distances from the primary device.

6. A method as in claim 1, wherein the first device activity comprises execution of a specified command within a particular software application.

7. A computing device comprising:

a plurality of different wireless radio communication engines, each engine to detect a unique device identifier (UDID) broadcast from a secondary device over a particular wireless radio communication protocol;

a storage device to store an activity association list that specifies a plurality of device activities and a plurality of UDID groupings, the activity association list specifying each device activity as being associated with a unique UDID grouping of the plurality of UDID groupings; and an activity control module to compare detected UDIDs with UDIDs in the plurality of UDID groupings in the activity association list, and to control a first device activity when the UDIDs in a first UDID grouping are detected in a particular order specified in the activity association list, wherein the activity association list specifies that the first device activity is associated with the first UDID grouping.

8. A computing device as in claim 7, wherein the activity association list specifies a second device activity as being associated with a second UDID grouping, wherein the activity association list specifies that the second device activity is performed in response to detecting the UDIDs in the second UDID grouping in any detection order.

9. A computing device as in claim 7, further comprising an authorized UDID list, wherein the activity control module is to compare detected UDIDs with the authorized UDID list to verify the detected UDIDs.

10. A computing device as in claim 7, further comprising a user-configurable scan interval to provide an amount of time to elapse between scanning for UDIDs.

11. A computing device as in claim 7, wherein the first device activity comprises execution of a specified command within a particular software application.

12. A non-transitory machine-readable storage medium storing instructions that when executed by a processor of a primary device, cause the primary device to:
   scan for unique device identifiers (UDIDs) associated with secondary devices;
   detect a first set of UDIDs within a scanning range in a particular detection order;
   determine from a user-configured activity list that the detected first set of UDIDs is associated with a first device activity, wherein the activity list includes a plurality of device activities and associated sets of UDIDs, wherein the activity list specifies that the first device activity is performed in response to a detection of the first set of UDIDs in the particular detection order; and
   perform the first device activity while the first set of UDIDs is detected by the scan.

13. A non-transitory machine-readable storage medium as in claim 12, the instructions further causing the primary device to cease to perform the activity when one of the first set of UDIDs is not detected by the scan.

14. A non-transitory machine-readable storage medium as in claim 12, wherein scanning for UDIDs comprises scanning at a pre-configured interval.

15. A non-transitory machine-readable storage medium as in claim 14, wherein scanning for UDIDs comprises:
   scanning for UDIDs broadcast over wireless radio protocols from secondary devices; and
   detecting a UDID when a secondary device comes within range of the primary device, the range depending on what type of wireless radio protocol is broadcasting the UDID.

16. A non-transitory machine-readable storage medium as in claim 12, wherein the activity list specifies a second device activity as being associated with a second set of UDIDs, wherein the second set of UDIDs is different from the first set of UDIDs, wherein the activity list specifies that the second device activity is performed in response to detecting the second set of UDIDs in any detection order.

17. A non-transitory machine-readable storage medium as in claim 12, wherein the first device activity comprises execution of a specified command within a particular software application.

* * * * *